United States Patent [19]

Kato

[11] 3,821,812

[45] June 28, 1974

[54] DEVICE FOR MOVING MAGNETIC HEAD AWAY FROM MAGNETIC SHEET IN MAGNETIC RECORDING AND REPRODUCING APPARATUS OF THE SPIRAL TRACK TYPE

[75] Inventor: Saburo Kato, Tokyo, Japan

[73] Assignee: Ricoh Co., Ltd., Tokyo, Japan

[22] Filed: Oct. 27, 1971

[21] Appl. No.: 192,879

[30] Foreign Application Priority Data

Nov. 5, 1970 Japan .............................. 45-97444

[52] U.S. Cl. ............................... 360/101, 274/13 A

[51] Int. Cl. ........................ G11b 5/82, G11b 21/04

[58] Field of Search ......... 274/4 H, 4 J, 13 R, 13 A; 179/100.2 T, 100.4 ST, 100.41 K; 178/6.6 A

[56] References Cited

UNITED STATES PATENTS

| | | | |
|---|---|---|---|
| 2,560,254 | 7/1951 | Shickel | 274/11 E |
| 3,210,082 | 10/1965 | Murata | 274/13 R |
| 3,596,914 | 8/1971 | Fujimotoo | 274/4 J |
| 3,638,954 | 2/1972 | Kato | 274/4 J |
| 3,680,871 | 8/1972 | Tupaj | 274/4 D |

*Primary Examiner*—Harry N. Haroian
*Attorney, Agent, or Firm*—Cooper, Dunham, Clark, Griffin & Moran

[57] ABSTRACT

A device for moving a magnetic head away from a magnetic sheet in magnetic recording and reproducing apparatus of the spiral track type which is operative to move the magnetic head away from the magnetic sheet when a turntable provided with the magnetic head for recording and playback rotates at a higher rate than when recording or playback is carried out or when the turntable rotates in the reverse direction.

11 Claims, 14 Drawing Figures

INVENTOR.
SABURO KATO
BY Henry T. Burke
ATTORNEY

INVENTOR.
SABURO KATO

BY

ATTORNEY

INVENTOR.
SABURO KATO
BY Henry T. Burke
ATTORNEY

INVENTOR.
SABURO KATO
BY
Henry T. Burke
ATTORNEY

DEVICE FOR MOVING MAGNETIC HEAD AWAY FROM MAGNETIC SHEET IN MAGNETIC RECORDING AND REPRODUCING APPARATUS OF THE SPIRAL TRACK TYPE

BACKGROUND OF THE INVENTION

This invention relates to magnetic recording and reproducing apparatus of the spiral track type in which a magnetic head is moved in a spiral track or path to record or reproduce information or sound on a stationary magnetic sheet. More particularly, it is concerned with a device in the apparatus mentioned which is effective to automatically move the magnetic head away from the magnetic sheet when the turntable provided with the magnetic head rotates at a higher rate than when recording or playback is carried out or when the turntable rotates in the reverse direction.

The magnetic recording and reproducing apparatus of the spiral track type mentioned above is known. The apparatus has the turntable for supporting the magnetic head which is provided with a magnetic head feed screw for moving the magnetic head radially of the turntable along a spiral track or path. The magnetic head feed screw rotates in conjunction with the turntable for moving the magnetic head radially of the turntable as aforementioned.

When recording or playback of information on one magnetic sheet is carried out, one may wish to do recording of some part once more or reproduce the same part again when the operation has gone halfway through. In such case, it is needed to move the turntable in the reverse direction so as to return the magnetic head to a desired position.

When playback of recorded information is carried out, one may wish to skip some part and this will make it necessary to effect quick feed of the magnetic head or to rotate the turntable at a higher rate when when recording or reproduction is carried out.

During the reverse rotation or quick feed of the magnetic head, it is not only meaningless, but also causes wear on the magnetic head and has deleterious effect on the magnetic head, to keep the magnetic head in contact with the magnetic sheet.

SUMMARY OF THE INVENTION

An object of this invention is to provide a magnetic head release device which is effective to automatically move the magnetic head away from the magnetic sheet when the turntable is rotated in the reverse direction.

Another object of the invention is to provide a magnetic head release device which is effective to automatically move the magnetic head away from the magnetic sheet when the turntable is rotated at a higher rate than when recording or playback is carried out.

To these and other ends, the present invention broadly contemplates the provision of magnetic recording and reproducing apparatus including means for holding a magnetic recording sheet in a fixed, downwardly facing position, a magnetic head disposed beneath the fixed sheet position for contact with the sheet, and means for advancing the head at a predetermined rate and in a predetermined direction along a spiral path of progressively decreasing radius in contact with the sheet, wherein the improvement broadly comprises the combination, with the foregoing elements, of means responsive to increase in rate of and/or reversal in direction of movement of the advancing means for moving the head transversely away from the sheet to disengage the head from the sheet during movement of the head by the advancing means in a direction opposite to the aforementioned predetermined direction, or at increased rate. The invention may be embodied in apparatus including means for advancing the head, as aforesaid, in a first mode of motion characterized by a predetermined rate and direction, i.e., the normal forward motion of the head for recording or reproducing operation, and also for moving the head in at least one other mode of motion differing from the first mode of motion, e.g., in rate and/or direction. Thus, the second mode of motion may be a fast forward motion, or a reverse motion. Means may be provided for selectively operating the advancing means to move the head in a chosen one of these modes. In accordance with the invention, there is incorporated in such apparatus means responsive to change in motion of the advancing means from one of its modes of motion to another, for separating the head from the sheet and maintaining it out of contact with the sheet during movement of the head in the second mode of motion.

More particularly, the invention in important specific aspects contemplates the provision of a magnetic head release device for magnetic recording and reproducing apparatus of the spiral track type comprising means for supporting and holding a magnetic sheet in a predetermined position with a magnetized surface of the magnetic sheet facing downwardly, a turntable provided with a magnetic head which is supported such that it can be brought into and out of engagement with the magnetized surface of the magnetic sheet, magnetic head feed means comprising a feed screw for moving the magnetic head in a spiral track or path toward the center of the turntable as the turntable rotates, means including a plate for elevationally supporting the magnetic head, and an actuation member frictionally engaging a nonthreaded portion of the feed screw, the actuation member being prevented from pivoting about the feed screw when the feed screw rotates in the normal direction, the actuation member being permitted to pivot so as to move the head support plate downwardly when the feed screw rotates in the reverse direction.

In another specific aspect, the invention contemplates the provision of an actuation member pivotally connected to the turntable and having a weighted free end, with a bias spring for holding the actuation member in a first, inward position relative to the turntable when the turntable rotates at normal rate, but permitting outward motion of the weighted end of the actuation member by centrifugal force upon increase in the rate of turntable rotation, and means actuated by such movement of the actuation member for moving the magnetic head downwardly so as to separate the head from contact with the recording sheet when the turntable rotates at a faster than normal rate.

In a still further specific aspect, the invention contemplates the provision of a thin resilient strip having a free end and mounted on one side of the magnetic head for contact of the free end with the magnetic sheet, in such position as to be disposed rearwardly of the top of the magnetic head when the head is moving in the forward direction, and to be interposed between the head and sheet for separation of the head from the sheet upon movement of the head in reverse direction.

This invention offers advantages in that wear of the magnetic head is minimized and no damage is caused to the magnetic sheet.

Additional objects as well as features and advantages of this invention will become evident from the description set forth hereinafter when considered in conjunction with the accompanying drawings.

DETAILED DESCRIPTION

Figure 1:
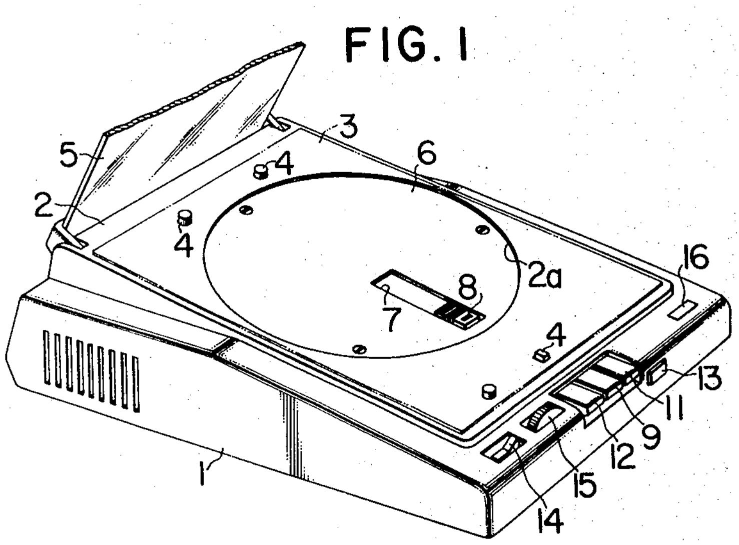
FIG. 1 is a perspective view of a magnetic recording and reproducing apparatus of the spiral track type incorporating one embodiment of the magnetic head release device according to this invention.

A magnetic recording and reproducing apparatus of the spiral track type incorporating the magnetic head release device according to this invention is shown in FIG. 1. The apparatus comprises an outer case 1 having a top plate 2 on which a magnetic sheet 3 can be placed. For clarity of illustration, only the outline of the sheet is shown in FIG. 1. Magnetic sheet 3 is held by three ruler pins 4 of relatively small length to be correctly positioned on top plate 2. A keep plate 5 of a transparent material is hingedly connected to one marginal portion of top plate 2 so as to hold magnetic sheet 3 in place on top plate 2, in which is formed an annular opening 2*a* of a large diameter which contains therein a style disc 6 substantially integral with a turntable subsequently to be described. Style disc 6 has a radial slot 7 through which extends outwardly a magnetic head 8 mounted in the turntable. Magnetic head 8 rotates together with the turntable and is gradually moved from the outer peripheral portion of the turntable toward the center thereof by a feed screw subsequently to be described during its rotation along a spiral track or path. Thus, magnetic head 8 traces a spiral track in its rotation with the turntable and moves toward the central portion of the turntable. By bringing magnetic head 8 into contact with the recording and reproducing surface of magnetic sheet 3 and causing the same to slide therealong in a spiral path, it is possible to record and reproduce information on magnetic sheet 3.

In performing a recording or playback operation, rotation of the turntable can be initiated and interrupted by operating a recording and reproducing pushbutton 9. Quick feed of the turntable can be effected by operating a quick feed pushbutton 11, and the turntable can be rotated in the reverse direction by operating a reverse rotation pushbutton 12. A recording operation can be performed by operating a recording pushbutton 13 as well as recording and reproducing pushbutton 9. Description of recording, playback, quick feed and reverse rotation operations which can be performed by operating the aforementioned buttons will be omitted. The numeral 14 refers to a power source switch 15, a volume-adjusting knob, and 16 a counter for indicating the number of revolutions of the turntable.

Figure 2:
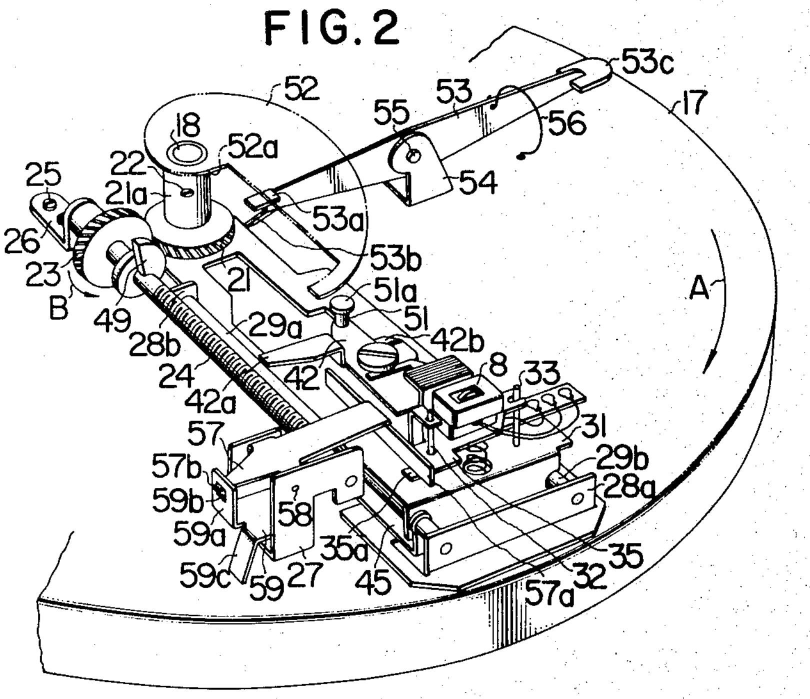
FIG. 2 is a perspective view of essential portions of the head-moving mechanism of the magnetic recording and reproducing apparatus of FIG. 1.
Figure 3:
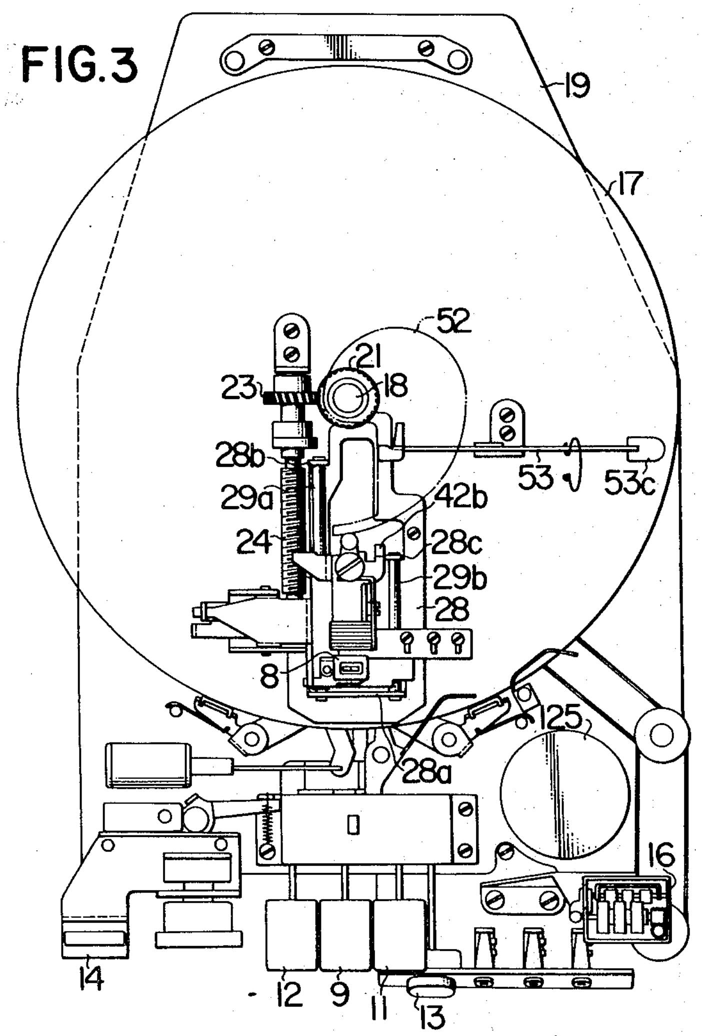
FIG. 3 is a plan view showing the internal structure of the magnetic recording and reproducing apparatus of FIG. 1.

As illustrated in FIG. 2, a turntable 17 is rotatably supported by a shaft 18 which is secured, at its base, to a main mounting plate 19 shown in FIG. 3. Secured by a screw 22 threaded into a cylindrical body 21*a* is a helical gear 21 substantially integral with cylindrical body 21*a* which helical gear is maintained in meshing engagement with another helical gear 23. Helical gear 23 is secured to a feed screw 24 which is supported at one end thereof by a supporter 26 secured to turntable 17 by a screw 25 and at the other end thereof by another supporter 27, so that feed screw 24 is rotatably supported in a plane parallel to the horizontal surface of turntable 17.

Figure 4:
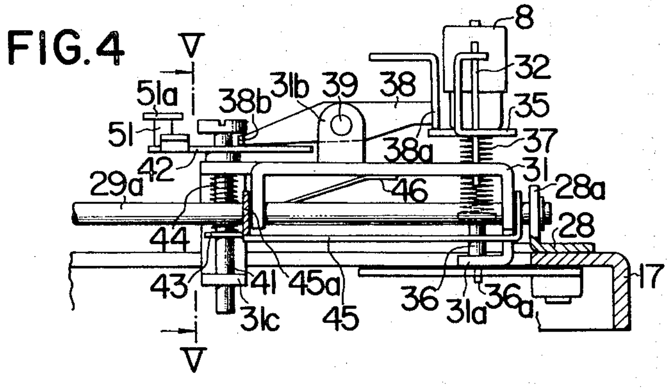
FIG. 4 is a side view of the head-moving mechanism.

Turntable 17 is rotated in the direction of an arrow A as subsequently to be described. Rotation of the turntable 17 results in helical gear 23 rotating in the direction of an arrow B. Two long and short guide rods 29*a* and 29*b* disposed parallel to each other extend between a rising portion 28*a* of a holder 28 secured to turntable 17 and other rising portions 28*b* and 28*c* of holder 28 shown in FIG. 3. As shown in FIGS. 3 and 4, a movable table 31 is slidably mounted on guide rods 29*a* and 29*b*. A magnetic head support plate 35 having magnetic head 8 secured thereto is loosely fitted for elevational motion over two guide rods 32 and 33 vertically mounted on movable plate 31.

Mounted between a support post 36 attached to a bent portion 31*a* of movable plate 31 as shown in FIG. 4 and head support plate 35 is an expansion spring 37 which normally urges, by its biasing force, head support plate 35 to move upwardly. A lever 38 having a bent portion 38*a* positioned against head support plate 35 to preclude upward movement of magnetic head 8 is pivotally connected by a shaft 39 to a rising portion 31*b* of movable plate 31. Lever 38 has another bent portion 38*b* which is brought by the biasing force of spring 37 into pressing engagement with an elevational plate 42 secured to a shaft 41. Shaft 41 is loosely received in openings formed in movable table 31 and a bent portion 31*c* thereof and normally urged to move downwardly by the biasing force of an expansion spring 44 mounted between movable table 31 and a flange 43 secured to shaft 41.

Mounted on guide rod 29*a* supporting movable table 31 is drive means 45 which holds the legs of movable table 31 therebetween as shown in FIG. 4. Drive means 45 includes an arm 45*a* shown in FIG. 5 which can be seen if the left end portion of drive means 45 shown in FIG. 4 is seen from the left. Arm 45*a* presses at one end 45*b* thereof, with a light force, against the flange 43 of shaft 41 by virtue of the biasing force of a needle spring 46 secured at its base to movable table 31. Arm 45*a* supports, at the other end thereof through a shaft 47, a roller 48 which engages, at one portion of its outer peripheral surface, feed screw 24 adapted to rotate in the direction of arrow B together with helical gear 23 when the turntable 17 rotates in the direction of arrow A as shown in FIG. 2.

As feed screw 24 rotates, drive means 45 gradually moves leftwardly as seen in FIG. 4. That is, magnetic head 8 moves from the outer peripheral portion of turntable 17 toward the central portion thereof as the turntable rotates in FIG. 2, so that magnetic head 8 moves toward the center of turntable 17 while moving in a spiral track or path.

When movable table 31 supporting magnetic head 8 reaches a locality near the center of turntable 17, a short arm 42*a* of elevational plate 42 is lifted in FIG. 2 by a cam 49 secured to rotating feed screw 24. Elevational plate 42 has attached thereto a shaft 51 having a flange 51*a* at its upper end. As elevational plate 42 is lifted as aforementioned by the action of cam 49, flange 51*a* engages a peripheral edge 52*a* of the base of a restoring plate 52 secured to shaft 18.

As elevational plate 42 is lifted and lever 38 pivots clockwise about shaft 39 in FIG. 4, bent portion 38*a* of lever 38 moves head support plate 35 downwardly, thereby moving magnetic head 8 downwardly. As the movement of magnetic head 8 along a spiral track or path thus reaches its terminating point, magnetic head 8 is moved downwardly away from magnetic sheet 3. Shaft 41 secured to elevational plate 42 moves upwardly simultaneously as elevational plate 42 is lifted. At this time, arm 45 is pivoted clockwise about guide rod 29*a* in FIG. 5 by flange 43. As a result, roller 48 is released from engagement with feed screw 24, thereby releasing drive means 45 from the influence of feed screw 24.

Figure 5:
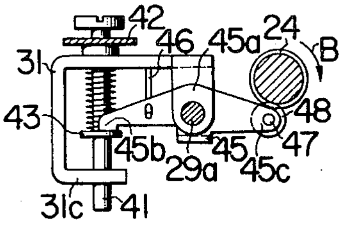
FIG. 5 is a sectional view taken along the line V—V of FIG. 4, with the magnetic head and other parts being omitted.

If turntable 17 rotates in the direction of arrow A in FIG. 2 while flange 51*a* substantially integral with elevational plate 42 engages peripheral edge 52*a* of restoring plate 52, flange 51*a* will gradually be moved outwardly along the increasingly protruding peripheral edge of restoring plate 52. As a result, magnetic head 8 returns to its starting position shown in FIG. 2 when the turntable has made substantially one complete revolution. As flange 51*a* is released from engagement with the restoring plate, roller 48 of drive means 45 is brought into engagement with feed screw 24 again as shown in FIG. 5, and magnetic head 8 is restored to the height shown in FIG. 4, i.e., to operative position for engaging the surface of a downwardly facing magnetic sheet on plate 2.

When elevational plate 42 is pushed upwardly by the action of cam 49 in FIG. 2, a downwardly inclined bent portion 42*b* of elevational plate 42 scoops up a bent portion 53*a* of an operation lever 53 pivotally connected through a shaft 55 to a supporter 54 secured to turntable 17. Lever 53 has a leg 53*b* which is brought into pressing engagement with the surface of turntable 17 by the biasing force of a spring 56 mounted between turntable 17 and operation lever 53. Operation lever 53 is adapted to cause turntable 17 to stop rotating when magnetic head 8 is restored to its starting position shown in FIG. 2. Detailed description of the operation of lever 53 will be omitted.

Figure 6:
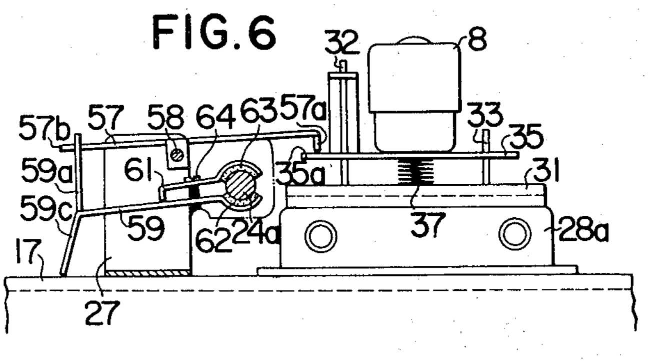
FIG. 6 is a front view of the head-moving mechanism of FIG. 4.

During the time when magnetic head 8 is being restored to its starting position after completion of its operation, the magnetic head is moved away from magnetic sheet 3 through the agency of lever 38 shown in FIG. 4 as aforementioned. Magnetic head 8 is also preferably moved away from magnetic sheet 3 when the head is moved in the reverse direction (i.e., by reverse rotation of the turntable) from any point as desired, in order to avoid wear of the magnetic head and damage to the magnetic sheet as well as to prevent noise production. FIG. 6 shows one form of friction means for moving the magnetic head downwardly when the turntable is rotated in the reverse direction.

A pressing portion 57*a* of a release member 57 is spaced apart a small distance from a projecting portion 35*a* of head support plate 35 shown in FIG. 2. Release member 57 is pivotally supported through a shaft 58 by supporter 27 secured to the turntable and has an end portion 57*b* disposed opposite to pressing portion 57*a* which end portion loosely extends through an opening 59*b* formed in a rising portion 59*a* of an actuation member 59 as shown in FIG. 2. Actuation member 59 and an auxiliary plate 61 are mounted on a nonthreaded portion 24*a* of feed screw 24 through friction members 62 and 63. By adjusting a screw 64, it is possible to adjust a clamping force exerted by actuation member 59 on nonthreaded portion 24*a* of feed screw 24.

When turntable 17 rotates in the direction of arrow A or clockwise in FIG. 1, the nonthreaded portion 24*a* of feed screw 24 rotates counterclockwise in FIG. 6. This causes actuation member 59 to pivot counterclockwise about non-threaded portion 24*a*. However, since a leg 59*c* of member 59 is positioned against the surface of turntable 17, actuation member 59 is held in a position shown in FIG. 6.

Figure 7:
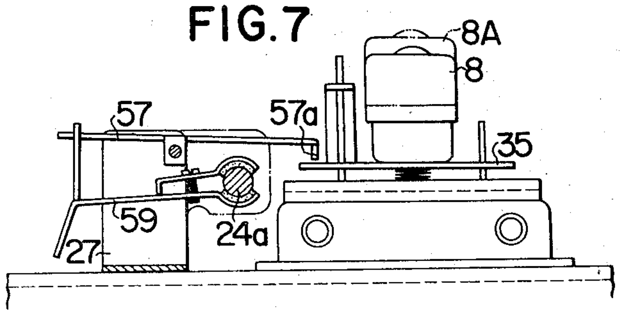
FIG. 7 is a view similar to FIG. 6 but showing the magnetic head moved downwardly by frictional means.

If the nonthreaded portion 24*a* of feed screw 24 is caused to rotate clockwise, as it does when the direction of rotation of turntable 17 is reversed, actuation member 59 will be pivoted clockwise through friction members 62 and 63, so that the rising portion 59*a* of member 59 causes release member 57 to pivot clockwise (as seen in FIG. 6) about shaft 58. As release member 57 pivots clockwise, head support plate 35 is moved downwardly by the pressing portion 57*a* of release member 57. As a result, magnetic head 8 moves downwardly from a dash-and-dot line position 8A to a solid line position shown in FIG. 7, so that magnetic head 8 is moved away from magnetic sheet 3 shown in FIG. 1 when turntable 17 is rotated in the reverse direction.

Figure 8:
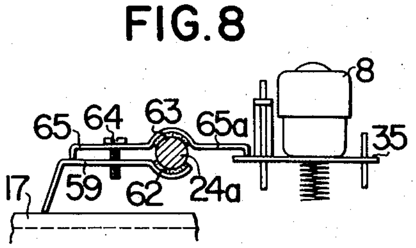
FIG. 8 is a front view of a modified form of head-moving mechanism.
Figure 9:
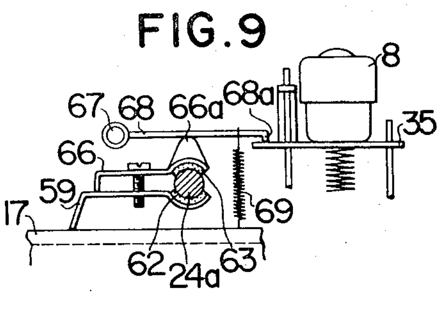
FIG. 9 is a front view of another form of head-moving mechanism.

FIGS. 8 and 9 illustrate other forms of the mechanism for moving downwardly the magnetic head when the turntable is rotated in the reverse direction. Parts of the mechanism which function in a manner similar to the parts of the mechanism shown in FIG. 6 will be designated by like reference characters. As shown in FIG. 8, the provision of an auxiliary plate 65 having an arm 65*a* directly in contact with elevational plate 35 eliminates release member 57 shown in FIG. 6, thereby simplifying the construction of mechanism.

The example shown in FIG. 9 comprises an auxiliary plate 66 having a projection 66a with which is maintained in contact a front end 68a of a release lever 68 pivotally connected through a shaft 67 to an immovable member (not shown) mounted on the turntable. Release lever 68 is normally urged to pivot clockwise by the biasing force of a compression spring 69 connected at one end thereof to turntable 17 and at the other end thereof to lever 68. When actuation member 59 pivots clockwise in the same manner as described with reference to FIG. 6, release lever 68 moves in slaved relation to the projection 66a of auxiliary plate 66 and pivots clockwise too, causing lever end 68a (which bears against plate 35) to depress plate 35, lowering the magnetic head. In the mechanism shown in FIG. 9, the amount of downward movement of elevational plate 35 during the pivotal movement of actuation member 59 is selected by adjusting the length of release lever 68 and the position of projection 66a.

Figures 10, 12, 13:
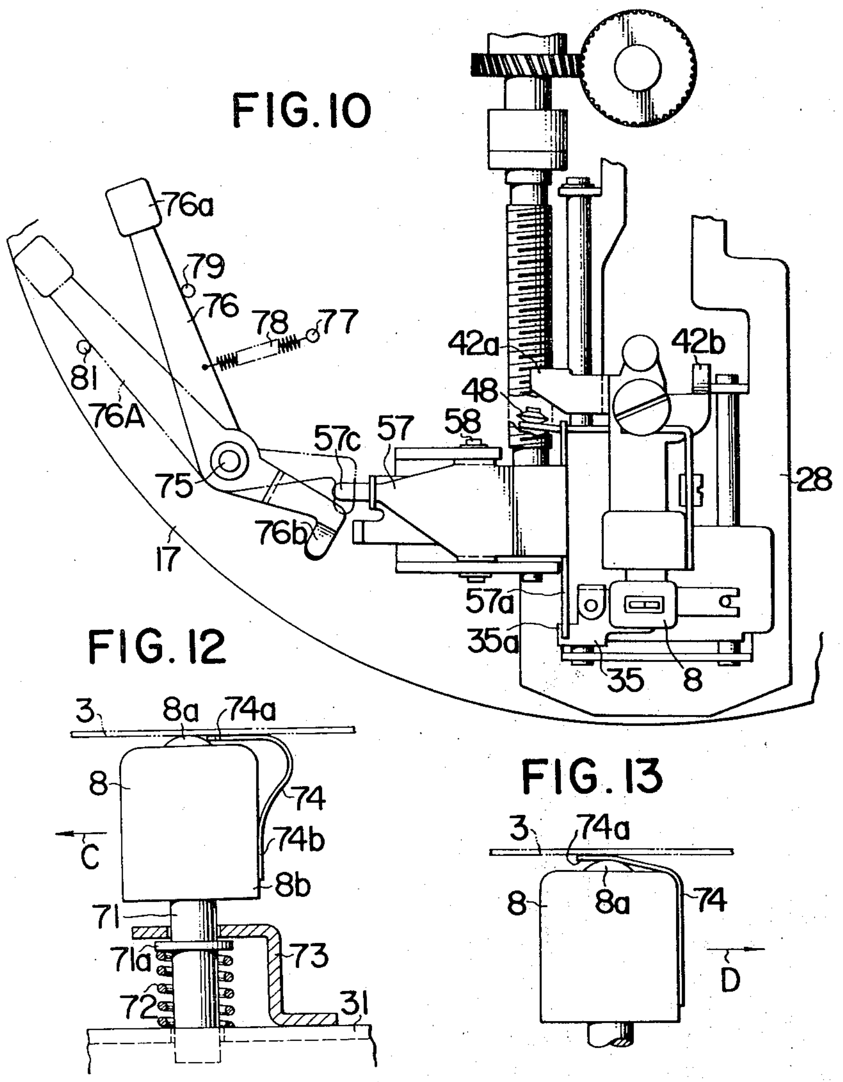
FIG. 10 is a plan view of a magnetic head-lowering mechanism operated by centrifugal force.
FIG. 12 is a side view of the magnetic head provided with a thin shield strip to be disposed between the magnetic head and sheet.
FIG. 13 is a side view of the magnetic head of FIG. 12 with the thin shield strip being interposed between the magnetic head and sheet.

The mechanism shown in FIG. 12 is adapted to move magnetic head 8 away from magnetic sheet 3 without using actuation member 59 and release member 57 when the direction of rotation of turntable 17 is reversed. A shaft 71, to which magnetic head 8 is secured, loosely extends through an opening formed in movable table 31, and an expansion spring 72 is mounted between a flange 71a secured to shaft 71 and movable plate 31. Magnetic head 8 is held in the position shown by a support plate 73 secured to movable table 31.

A thin shield strip 74 made of Mylar or other similar material which has a low coefficient of friction and substantial resilience is secured at a base 74b thereof to one side 8a of magnetic head 8. Thin shield strip 74 has a free end portion 74a which is disposed between magnetic sheet 3 and the upper end portion of magnetic head 8 as shown in FIG. 12. When turntable 17 rotates clockwise or in the direction of arrow A in FIG. 2 and magnetic head 8 moves in the direction of arrow C, the free end portion 74a of thin shield strip 74 is kept out of engagement with a top 8a of magnetic head 8 as shown in FIG. 12. When magnetic head 8 moves in the direction of an arrow D as turntable 17 rotates in the reverse direction, the free end portion 74a of thin shield strip 74 disposed between magnetic sheet 3 and magnetic head 8 is brought into contact with the top 8a of magnetic head 8, so that magnetic head 8 is separated (by strip 74) from direct contact with magnetic sheet 3. Restoration of the forward direction of turntable rotation causes strip 74 to be withdrawn again to the position shown in FIG. 12, once again permitting contact between head 8 and sheet 3.

Figure 14:
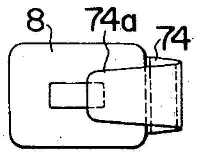
FIG. 14 is a plan view of FIG. 13.
Figure 11:
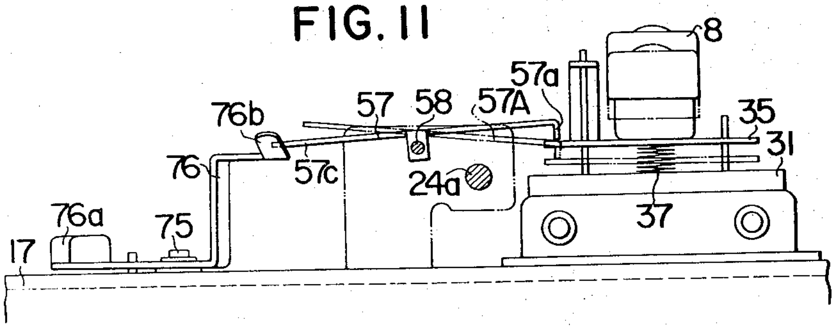
FIG. 11 is a front view of FIG. 10.

Downward movement of magnetic head 8 by the action of friction means shown in FIGS. 6 – 9, and separation of magnetic head 8 from engagement with magnetic sheet 3 by the action of thin shield strip 74 shown in FIGS. 12 – 14, take place only when turntable 17 rotates in the reverse direction. When turntable 17 is rotated at high speed and magnetic head 8 is moved quickly, magnetic head 8 is moved away from magnetic sheet 3 by a centrifugal force-operated mechanism shown in FIGS. 10 and 11. Parts of the mechanism for carrying the centrifugal force process into practice which are similar in function to the parts of mechanism shown in FIG. 6 are designated by like reference characters.

In FIG. 10, an actuation member 76 is pivotally connected through a shaft 75 to turntable 17 and normally urged to pivot clockwise about shaft 75 by the biasing force of a compression spring 78 connected at one end thereof to a pin 77 attached to turntable 17 and at the other end thereof to actuation member 76. A stopper 79 attached to turntable 17 is intended to prevent pivotal movement of actuation member 76 caused by the biasing force of spring 78, and a stopper 81 is for limiting the range of pivotal movement of actuation member 76.

Actuation member 76 has a weight 76a secured to one free end thereof, and is formed at the other end thereof with an actuator 76b which is bent obliquely upwardly from actuation member 76. Generally, turntable 17 rotates at higher speed when the magnetic sheet is fed quickly or rotated in the reverse direction than when information is recorded thereon or reproduced therefrom in a recording and reproducing apparatus, so that the centrifugal force acts on various parts on turntable 17. If turntable 17 rotates at high speed, the centrifugal force acting on weight 76a will get the better of the biasing force of spring 78 exerted on actuation member 76, with a result that actuation member 76 pivots to a dash-and-dot line position 76A in FIG. 10. This pivotal movement of actuation member 76 results in actuator 76b engaging and lifting a projection 57c of release member 57, so that the release member pivots about shaft 58 to a dash-and-dot line position 57A shown in FIG. 11 and moves head support plate 35 downwardly. Thus, the mechanism relying on the centrifugal force as aforementioned is effective to move magnetic head 9 away from magnetic sheet 3 when the turntable is fed quickly as well as rotated in the reverse direction. This is conducive to the prevention of wear which would otherwise be caused on the surface of magnetic sheet and production of noises which would otherwise be caused to occur in quick feed or reverse rotation of turntable.

It is to be understood that the invention is not limited to the features and embodiments hereinabove specifically set forth, but may be carried out in other ways without departure from its spirit.

What is claimed is:

1. In magnetic recording and reproducing apparatus, in combination, a. means for holding a magnetic recording sheet in a fixed, downwardly facing position;

b. a magnetic head disposed below said fixed position for contact with said sheet;

c. means for advancing said magnetic head in a first mode of motion characterized by a predetermined rate and a predetermined rotational direction along a spiral path of progressively decreasing radius in contact with said sheet, and for moving said head along said spiral path in at least one other mode of motion differing from said first mode of motion, said advancing means including i. means supporting said head for movement transversely of said sheet into and out of contact therewith and ii. a rotary element, having at least two modes of rotary motion respectively corresponding to said first mode of head motion and said one other mode of head motion, operatively connected to said head for imparting motion thereto as aforesaid; and d. means responsive to change of motion of said advancing means from said first mode to said one other mode for separating said head from said sheet and maintaining said head out of contact with said sheet during movement of said head in said one other mode, said separating means including an actuation member carried with said rotary element and movable relative thereto, by and in response to change in mode of rotary motion of said rotary element, into and out of a position for moving said head out of contact with said sheet.

2. Apparatus as defined in claim 1, wherein said one other mode of motion is characterized by movement of said head in a rotational direction opposite to said predetermined rotational direction, said two modes of rotary motion of said rotary element being opposite in direction to each other, and wherein said means for separating said head from said sheet is responsive to reversal in direction of motion of said rotary element.

3. Apparatus as defined in claim 1, wherein said one other mode of motion is characterized by movement of said head at a rate faster than said predetermined rate, said two modes of rotary motion of said rotary element differing from each other in rate, and wherein said means for separating said head from said sheet is responsive to increase in rate of motion of said rotary element.

4. Apparatus as defined in claim 1, wherein said means for separating said head from said sheet comprises means for interposing a layer of material between the head and sheet in response to change in motion of said rotary element as aforesaid.

5. In magnetic recording and reproducing apparatus, in combination, a. means for holding a magnetic recording sheet in a fixed, downwardly facing position;
b. a magnetic head disposed beneath said fixed position for contact with said sheet;
c. means for advancing said magnetic head at a predetermined rate and in a predetermined direction along a spiral path of progressively decreasing radius in contact with said sheet, said advancing means including
   i. a rotatably driven turntable disposed beneath said fixed position;
   ii. means for supporting said magnetic head on said turntable for movement transversely of said table into and out of engagement with said sheet; and
   iii. means for moving said head and said supporting means progressively toward the center of the turntable in correspondence with rotation of the turntable in said predetermined direction to impart spiral motion to the head as aforesaid, said means for moving said head toward the center of the turntable comprising a feed screw mounted on said turntable for forward and reverse rotary movement in correspondence with forward and reverse turntable rotation, and operatively interconnected with said head-supporting means for effecting movement of said head and supporting means, said feed screw having a smooth shaft portion; and
d. means responsive to reversal in the direction of rotation of said turntable for moving said head transversely away from said sheet to disengage said head from said sheet during rotation of the turntable in a diretion opposite to said predetermined direction, said reversal-responsive means comprising an actuation member frictionally engaging said smooth shaft portion of said feed screw for angular displacement in a given direction upon reverse rotation of the feed screw, said actuation member being operatively interconnected with said head-supporting means for converting angular displacement of said actuation member as aforesaid into downward motion of said head.

6. Apparatus as defined in claim 5, wherein said head-supporting means includes a movable plate for elevationally supporting said head, and wherein angular displacement of said actuation member as aforesaid effects downward motion of said plate; said actuation member being restrained, during forward rotation of the feed screw, in an angular position such that said plate is free to move upwardly.

7. Apparatus as defined in claim 6, wherein said reversal-responsive means further includes a release lever pivotally connected to said turntable and having one end positioned to bear downwardly against said plate, and spring means for biasing said lever downwardly against said plate, said actuation member bearing upwardly against said release lever for holding said release lever upwardly during forward rotation of said feed screw, and undergoing angular displacement to free said release lever upon reverse rotation of said feed screw.

8. Apparatus as defined in claim 6, wherein said reversal-responsive means further includes a lever pivotally connected to said turntable, having one end disposed to bear downwardly against said plate, said lever being connected to said actuation member for movement therewith such that angular displacement of said actuation member as aforesaid moves said lever to depress said plate.

9. Apparatus as defined in claim 6, wherein said actuation member directly engages said plate for depressing said plate upon angular displacement of said actuation member as aforesaid.

10. In magnetic recording and reproducing apparatus, in combination, a. means for holding a magnetic recording sheet in a fixed, downwardly facing position;
b. a magnetic head disposed beneath said fixed position for contact with said sheet;
c. means for advancing said magnetic head at a predetermined rate and in a predetermined direction along a spiral path of progressively decreasing radi in contact with said sheet, said advancing means including
   i. a rotatably driven turntable disposed beneath said fixed position;
   ii. means for supporting said magnetic head on said turntable for movement transversely of said table into and out of engagement with said sheet; and
   iii. means for moving said head and said supporting means progressively toward the center of the turntable in correspondence with rotation of the turntable in said predetermined direction to impart spiral motion to the head as aforesaid;
d. an actuation member pivotally connected to said turntable and having a weighted end, said actuation member being disposed for outward movement of said weighted end by centrifugal force upon rotation of said turntable, and being operatively interconnected with said head-supporting means for effecting downward movement of said head away from said sheet upon outward movement of said weighted end to a given position; and e. means resiliently biasing said actuation member inwardly of said given position for holding said weighted end away from said position during rotation of said turntable at said predetermined rate but permitting outward movement of said weighted end by centrifugal force to said given position upon increase in rate of rotation of said turntable above said predetermined rate.

11. In magnetic recording and reproducing apparatus, in combination, a. means for holding a magnetic recording sheet in a fixed, downwardly facing position;

b. a magnetic head disposed beneath said fixed position for contact with said sheet;

c. means for advancing said magnetic head at a predetermined rate and in a predetermined direction along a spiral path of progressively decreasing radius in contact with said sheet;

d. a thin strip secured to one side of said magnetic head with a free end portion disposed posteriorly of the top of said head during movement of said head in said predetermined direction so as to permit engagement of said head with said sheet, said free end portion of said strip being interposed between the top of the magnetic sheet upon reversely directed motion of the head to separate the head from the sheet during such reversely directed motion.

* * * * *